United States Patent [19]
Hamm

[11] 3,848,340
[45] Nov. 19, 1974

[54] DISTANCE AND DIRECTION RECORDING DEVICE AND METHOD

[76] Inventor: Alton B. Hamm, 3724 Scranton Dr., Fort Worth, Tex. 76118

[22] Filed: Sept. 25, 1972

[21] Appl. No.: 291,775

[52] U.S. Cl. ............................... 33/354, 73/178 R
[51] Int. Cl. .......................................... G01c 22/00
[58] Field of Search .......... 73/432 R; 33/354; 346/8

[56] References Cited
UNITED STATES PATENTS
2,546,888   4/1951   Duffin .................................. 33/354

*Primary Examiner*—Donald O. Woodiel
*Attorney, Agent, or Firm*—Wofford, Felsman, Fails & Zobal

[57] ABSTRACT

The specification discloses a system for recording distance and direction by shifting the center of gravity of a rotatable device as a function of the distance and direction traveled from a given departure point. The direction back to the departure point can be determined by allowing the device to turn on its axis, while generally horizontal, to allow the device to reach a new point of equilibrium as a function of the resultant weight shift applied to the device. In the embodiment disclosed, the rotatable device is aligned in a given azimuth by a magnetic north finding device and has a plurality of weights adapted to be moved radially by a control means as a function of distance and direction traveled.

21 Claims, 33 Drawing Figures

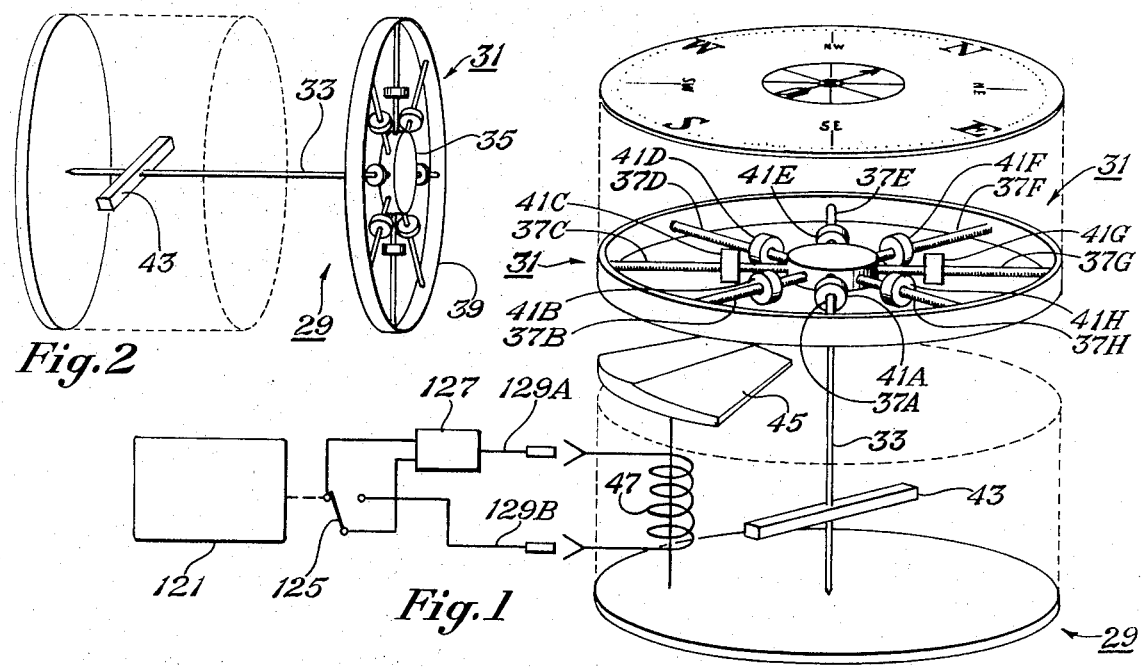
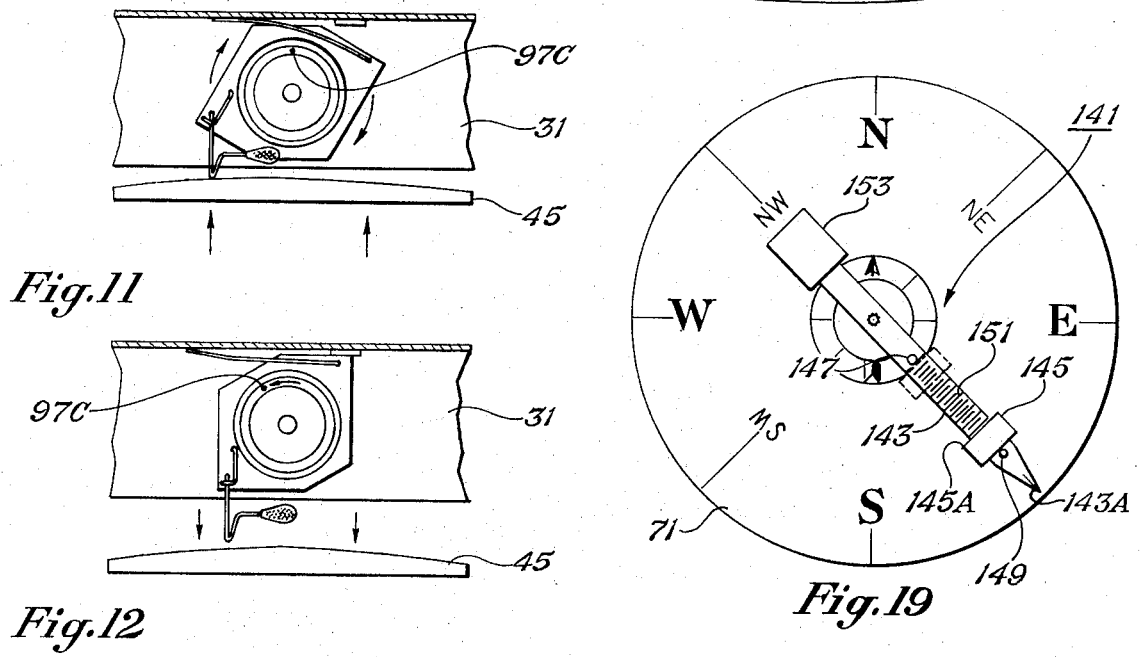
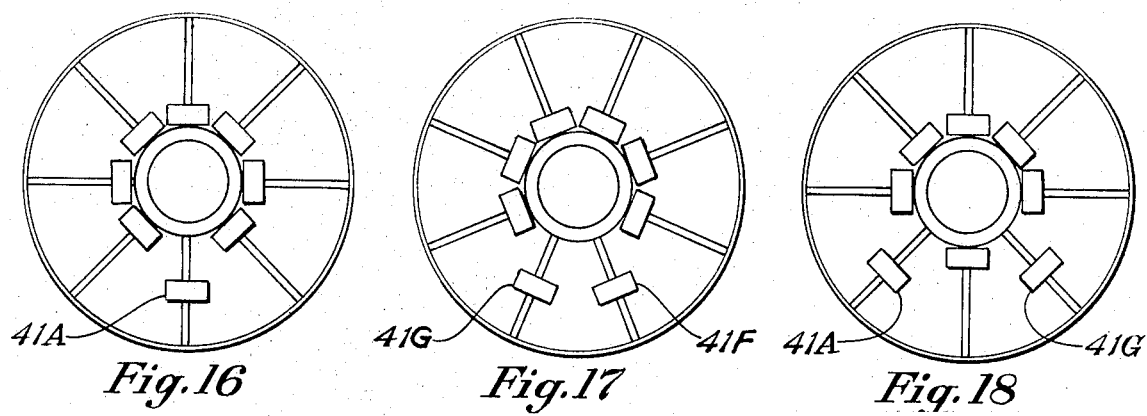

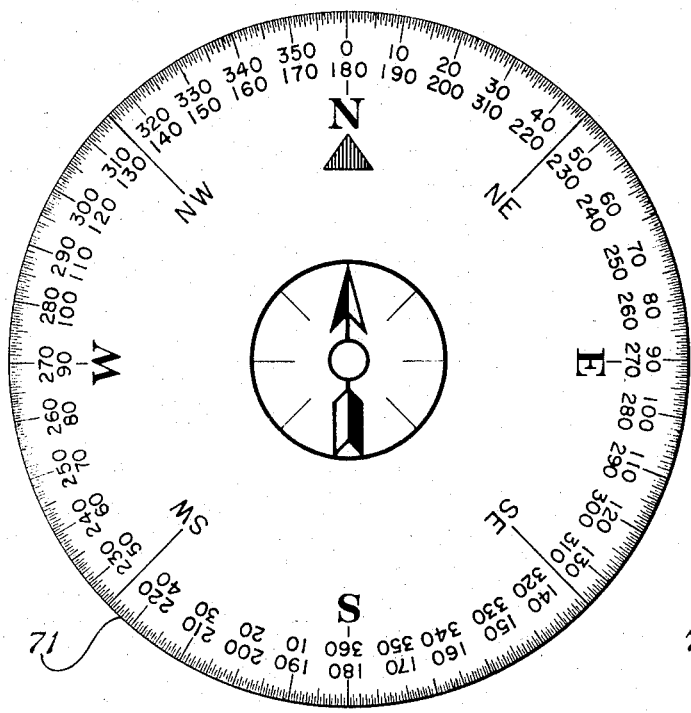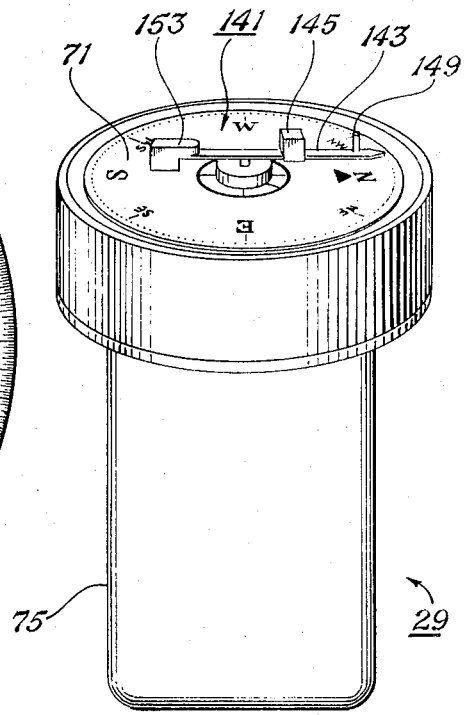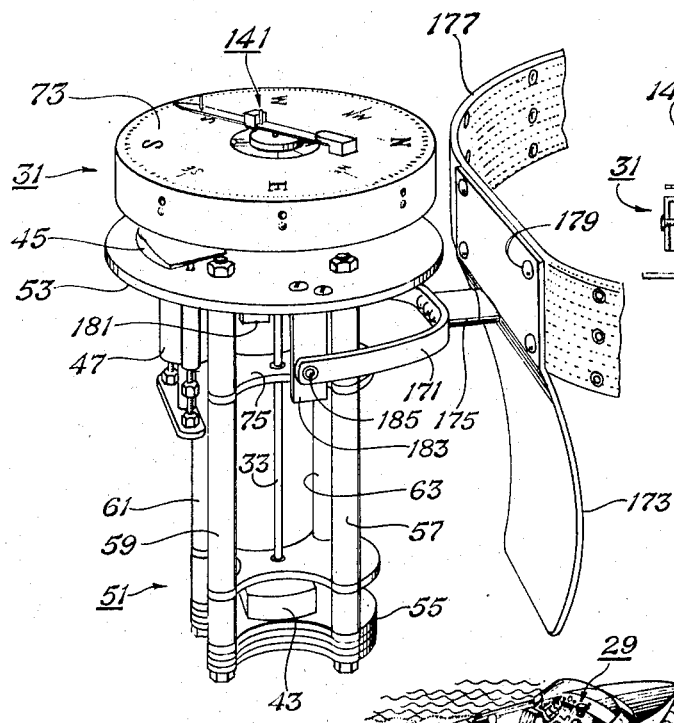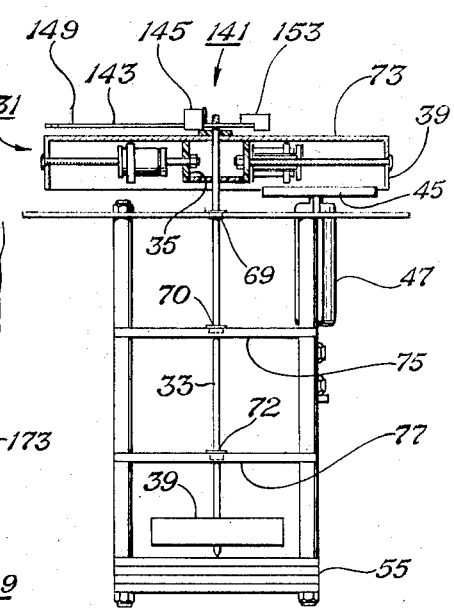
Fig.6
Fig.5
Fig.3
Fig.33
Fig.4

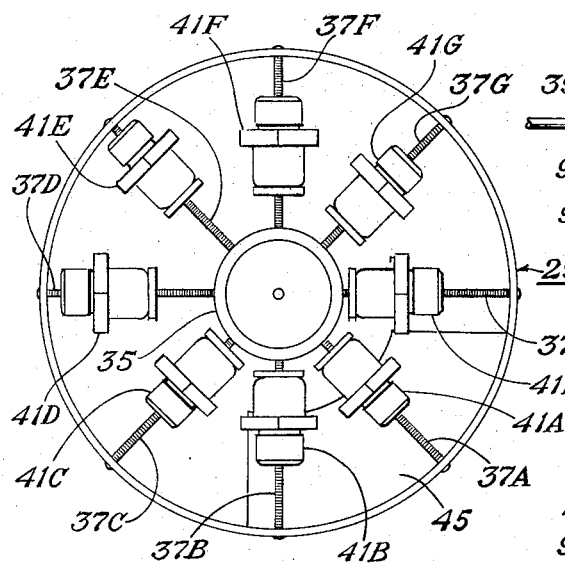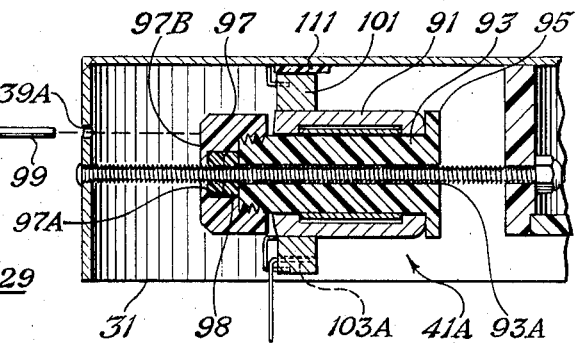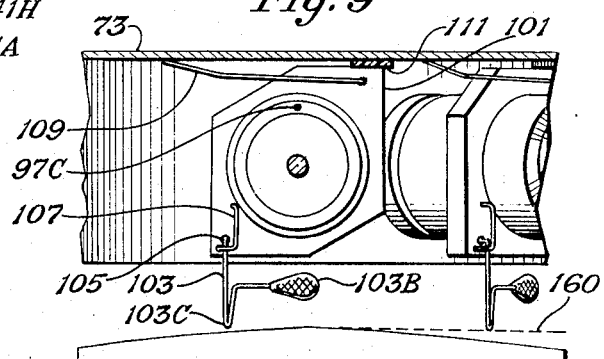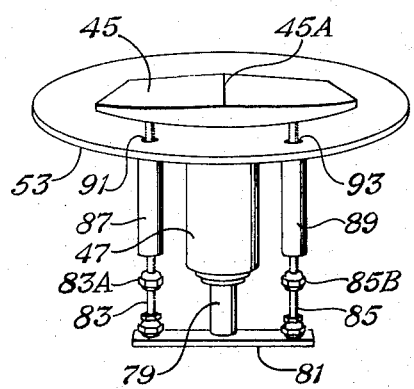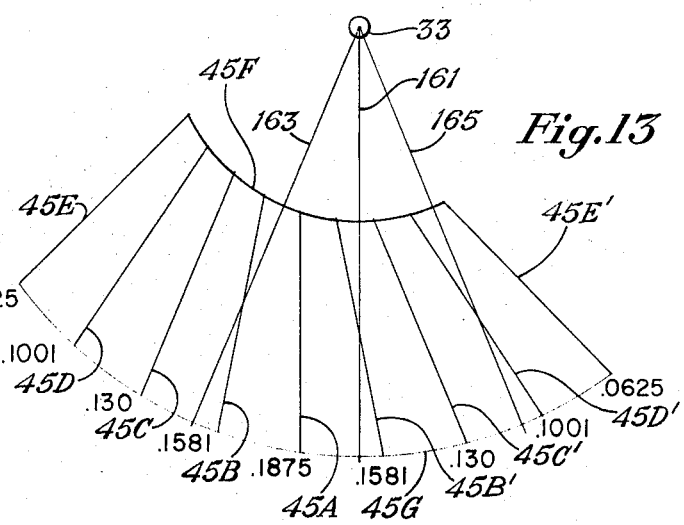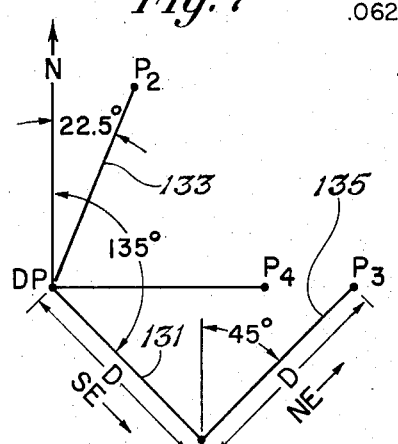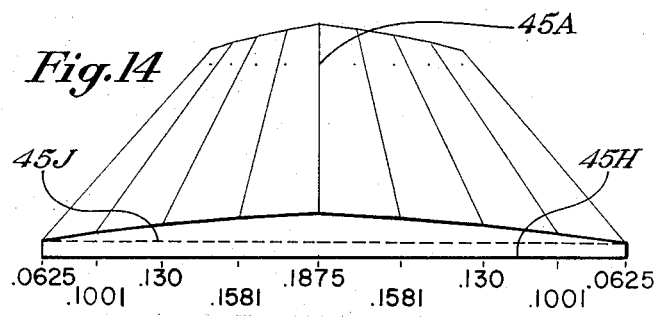

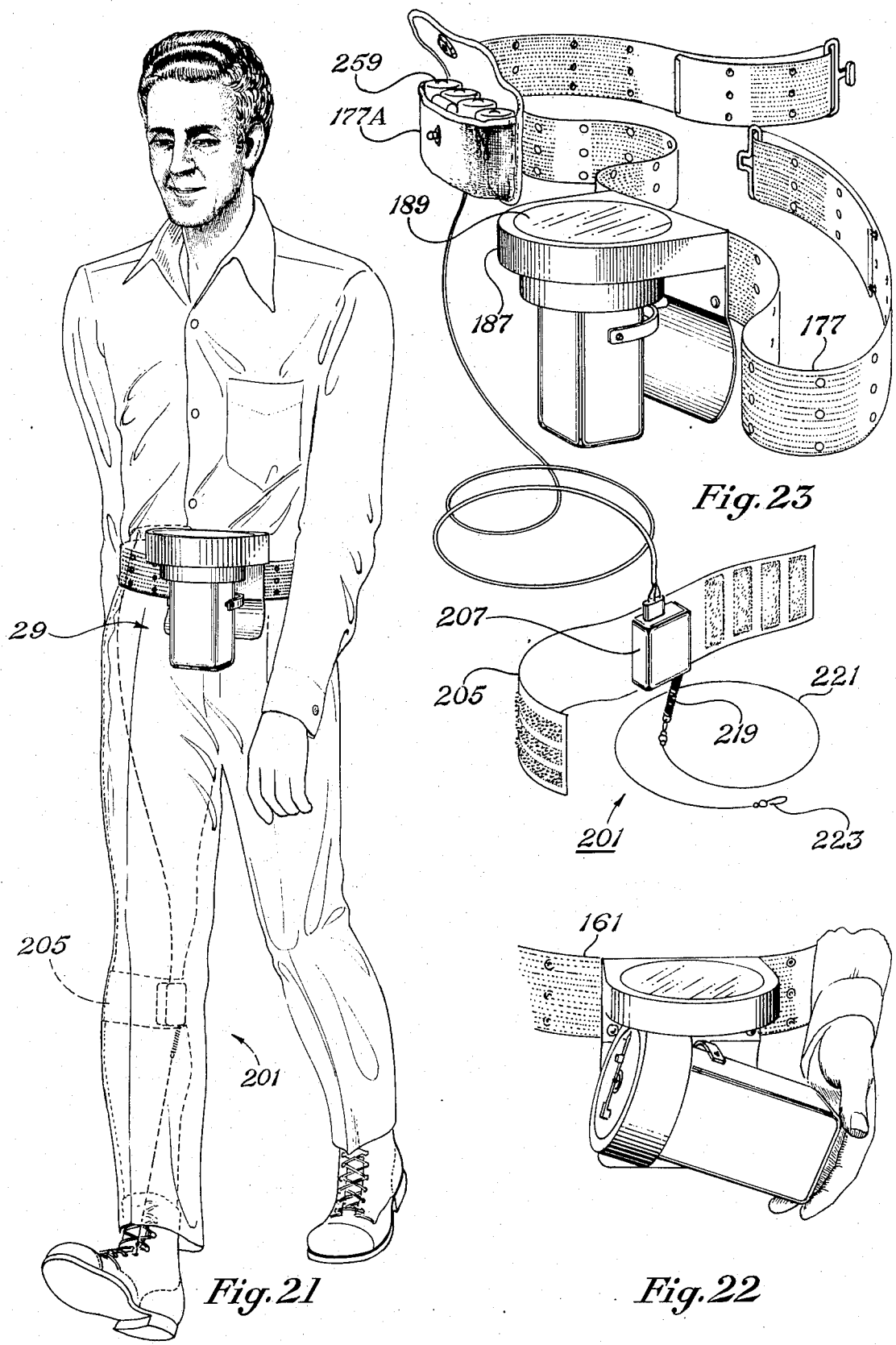

3,848,340

DISTANCE AND DIRECTION RECORDING DEVICE AND METHOD

BACKGROUND OF THE INVENTION

This invention relates to a guidance system for allowing one to determine the distance and direction of travel from a departure point and more particular to a guidance device for recording information representative of distance and direction of travel by shifting the center of gravity of the device as a function of the distance and direction traveled from the departure point.

Heretofore, a need has existed for a small, economical, and easy to operate guidance device for recording distance and direction traveled from a departure point and which may be readily and simply employed to allow one to determine the direction and distance back to the departure point. Such a device is especially desired by the sportsman or military personnel on foot.

SUMMARY OF THE INVENTION

It is an object of the present invention to provide such a device and which comprises a recording means adapted to have its center of gravity shifted and means responsive to information which is a function of the distance and direction of travel with the device for shifting the center of gravity of the recording means as a function of the distance and direction traveled.

In one aspect, there is provided azimuth finding means adapted to be aligned with a predetermined azimuth as the device is moved along the route of travel. In addition there is provided control means responsive to said azimuth finding means and to an input which is a function of the distance of travel, for shifting the center of gravity of the recording means as a function of the distance and direction traveled.

In a further aspect, the recording means comprises rotatable means supported for rotation about an axis and having a plurality of radially extending support means coupled to the rotatable means at given angular positions about its axis. In addition weight means is supported by each radial support means for radial movement with respect to the axis of the rotatable means. The control means is employed for radially moving the weight means along their support means to positions which are a function of the distance and direction of travel with the device.

In the embodiment disclosed, the azimuth finding means comprises magnetic means rotatably supported about an axis for alignment with magnetic north when the axis of the magnetic means is supported in a generally vertical position. The rotatable means is connected to the magnetic means for movement therewith for aligning a given position of the rotatable means with magnetic north as the magnetic means is aligned with magnetic north. The control means is supported by a base which is adapted to turn directions as the wearer or carrier turns directions. As the control means is moved near individual ones of the weight means it is adapted to move these weight means radially in response to signals which are a function of the distance traveled.

The magnetic means and rotatable means have the same axis of rotation formed by a common shaft. For finding the direction and distance back to the departure point, the device is adapted to be supported in a position to locate the axis of rotation of the magnetic means and the rotatable means in a generally horizontal position to render the magnetic means ineffective as a magnetic north finding means and to allow the rotatable means to be rotated to a point of equilibrium dependent upon the resultant weight shift occurring and resulting from the radial positions to which the weight means are moved.

In a further embodiment, there is provided a radially extending arm means supported by the shaft and adapted to be located angularly at a desired position relative to the rotatable means. Weight means is coupled to the arm means for radial movement along the arm means to a desired radial position relative to the rotatable means to shift the center of gravity of the rotatable means in a desired direction to allow one to determine the distance back to the departure point or to pre-set information into the device prior to departure.

BRIEF DESCRIPTION OF THE DRAWINGS

FIG. 1 illustrates the basic components of the guidance system for recording distance and direction of travel;

FIG. 2 illustrates the device of FIG. 1 turned on its side for retrieving information of direction and distance traveled;

FIG. 3 is a perspective view of the system of FIG. 1 showing its supporting structure;

FIG. 4 is a partial cross-sectional side view of FIG. 3;

FIG. 5 is a perspective view of the guidance system with its protective cover;

FIG. 6 is a plan view of the face plate of the guidance system;

FIG. 7 illustrates the control plate of the guidance system;

FIG. 8 is a plan view of the recording wheel of the guidance system with its top removed;

FIG. 9 is an enlarged cross-sectional side view of one of the weights of FIG. 8;

FIG. 10 is an end view of the weight shown in FIG. 9;

FIG. 11 is an end view of the weight of FIG. 9 showing rotational movement applied to its drive mechanism;

FIG. 12 is an end view of the weight of FIG. 9 showing return rotation of the drive means for rotating its core radially along its support;

FIG. 13 is a plan view of the plate of FIG. 7 illustrating its surface contours with relation to the axis of the recording wheel;

FIG. 14 is a perspective view of the control plate of FIG. 13;

FIG. 15 illustrates directions of travel used in explaining the operation of the guidance system;

FIGS. 16, 17, and 18 illustrate the manner in which radial movement of selected weights of the recording wheel affects its condition of equilibrium;

FIG. 19 is a top view of the guidance system showing its distance finding and determining mechanism;

FIG. 21 illustrates a distance measuring device coupled to a person's leg, the output of which is coupled to the guidance system strapped to a person;

FIG. 22 illustrates the manner in which the guidance system when strapped to a person may be turned on its side to determine direction and distance traveled;

FIG. 23 illustrates in more detail the leg mounted distance measuring device and the guidance system of FIG. 21;

FIG. 33 illustrates the guidance system employed on a carrier such as a boat.

DETAILED DESCRIPTION OF THE INVENTION

Figure 29:
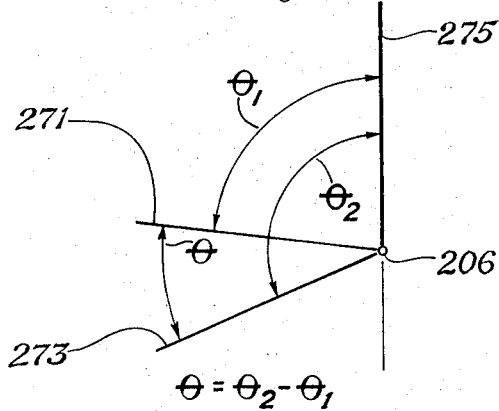
FIGS. 29-32 illustrate various angular ranges through which the foot swings relative to the ankle while walking over different terrains and the mechanism employed by the leg mounted distance measuring device for limiting the range of its follower arm.

Referring now to FIGS. 1 and 2, the guidance system for recording distance and direction of travel is identified at 29. It comprises a wheel shaped member 31 which is connected to a rotatable shaft 33 by way of its hub 35. The member 31 has eight radial supports 37A-37H connected between its hub 35 and its rim 39. These radial supports are symmetrically located around the hub 35 such that the angle between adjacent supports is equal to 45°. Supported on each radial support is a weight which is adapted to be moved radially along its support. These weights are illustrated at 41A-41H. When the weights 41A-41H are located adjacent the hub 35, the weight of the wheel 31 is symmetrically distributed around the shaft 33 whereby the wheel 31 will be "balanced." By shifting selected weights radially as a function of the distance and direction traveled from a given departure point, information of the distance and direction traveled will be stored and accumulated on the wheel 31. As the weights 41A-41H are shifted to different radial positions, the resultant shift in weight will cause the center of gravity of the wheel 31 to be shifted whereby it will become unbalanced. This unbalance or resultant shift in weight is employed to allow one to determine the direction and distance back to the original departure point.

In the embodiment disclosed, the system for shifting the weights radially as a function of the distance and direction traveled comprises a permanent magnet 43 connected to the shaft 33 and in addition a control means including a plate 45 and a solenoid coil 47 located below the wheel 31. The permanent magnet 43 is employed to maintain the wheel 31 in a given position relative to magnetic north. The coil 47 and plate 45 change directions as the path of travel changes and hence will move relative to the wheel 31 and the weights 41A-41H. Along the route of travel the coil 47 is energized repetitively by a signal which is a function of the distance traveled, to move the plate 45 upward. This causes the weights above the plate at the time of the signal to be moved radially outward. Thus along the route of travel, selected weights are moved radially outward to store information of the direction and distance traveled.

Referring also to FIGS. 3 and 4, the wheel 31, shaft 33, plate 45, and coil 47 are carried by a mount 51 comprising upper and lower bases 53 and 55 and connecting posts 57, 59, 61, and 63. Shaft 33 is supported for rotation by bearing 69 carried by upper base 53 and by bearings 70 and 72 carried by cross plates 75 and 77 connected between the posts. The lower end of the shaft 33 has a pointed end to turn against the upper surface of the lower base 55.

As indicated above, the permanent magnet 43 is provided for aligning a given position of the wheel 31 with magnetic north. In this respect, the magnet 43 and the wheel 31 are secured to shaft 33 such that their positions relative to each other remain fixed. They will turn together however as the shaft 33 turns. When the mount 51 is positioned such that the shaft 33 is maintained in a generally vertical position, the magnet 43 will be aligned with magnetic north whereby a "north" position on wheel 31 also will be aligned with magnetic north as the mount 51 is turned in different directions. The "north" position may be observed on a face plate 71 secured to the top 73 of the wheel 31. See also FIGS. 5 and 6. As shown in FIG. 5, an exterior cover 75 is provided for protection purposes.

The system 29 may be strapped to or carried by a person as illustrated in FIG. 21 or it may be coupled to a carrier such as a boat as illustrated in FIG. 33. When strapped to a person or coupled to a carrier, the mount 51 will be positioned such that the shaft 33 will be located in a generally vertical position. As the person or carrier travels along a route, the mount 51 will change directions with the person or carrier; however, the magnetic north finding device 43 and hence the "north" position of the wheel 31 will remain aligned with magnetic north.

Referring to FIGS. 1, 3, 4, and 7, the solenoid coil 47 and the plate 45 are secured to the mount 51 on its "front side" below the wheel 31. Coil 47 is secured to the underside of base 53 and has its plunger 79 coupled to the plate 45 for moving the plate 45 upward when the coil is energized. Connection to the plate 45 from the plunger 79 of the coil is by way of a lower plate 81. Secured to the upper end of plate 81 are two threaded rods 83 and 85. These rods are supported for movement within sleeves 87 and 89 which are connected to the underside of base 53. The upper ends of rods 83 and 85 extend through apertures 91 and 93 formed through base 53 and are connected to the underside of plate 45. In the unenergized condition of the coil 47, the plate 45 is located next to the upper surface of base 53. When the coil 45 is energized, plunger 79, and hence rods 83 and 85 are moved upward to move the plate 45 upward. Nuts 83A and 85A are provided for adjustment purposes to limit the upward movement of the rods 83 and 85 and hence the plate 45.

Referring to FIGS. 8-12 the weights 41A-41H comprise one-way clutches while the radial supports 37A-37H are threaded rods. In FIGS. 9-12 weight 41A is illustrated for discussion purposes. The other weights 41B-41H are constructed in the same manner. Each one-way clutch comprises a housing 91 which surrounds an inner core 93. Core 93 has an extending end 95 and a nut 97 threaded to the core for maintaining the housing around the core.

The housing 91 has interior ramps and rollers (not shown) which allow the housing to turn freely in one direction relative to the core and then to "lock up" to the core to turn the core with the housing as the housing is turned in the opposite direction. The one-way clutches were of the type purchased from the Torrington Company, Bearings Division, Torrington, Connecticut 06790 and are identified as catalog suffix number 040708.

The core 93 has a central bore 93A through which the threaded rod 37A extends for supporting the one-way clutch. A slip fit exists between the bore 93A and the rod 37A. Resilient O-rings 98 are located in the nut 97 and are pressed tightly against the inside wall 97A of the nut 97 to prevent slipage between the O-rings and the nut. The O-rings also are pressed tightly against the threaded rod 37A and into its threads whereby they in affect act as a threaded member to move the weight 41A outward when it is rotated in a counterclockwise direction as seen in FIGS. 10–12.

One may move the core 93 and the housing 91 radially inward by applying a radial force on the end 97B of the nut 97. This is possible due to the resiliency of the O-rings 98 which allow the O-rings to slide over the threads of the rod 37A when a radial force is applied to the end of the nut. The weights may be moved radially inward by inserting a small rod 99 through aperture 39A formed in the rim 39 above the rod 37A. In this manner the weight may be moved manually against the hub 35. Similar apertures are provided in the rim 39 above the other rods 37B-37H for allowing one to adjust all of the weights around the hub in order to reset the system for full range of operation and to balance the wheel 31 prior to departure.

Secured around the housing 91 is a plate 101 having a lower arm 103 pivotally coupled thereto at a position offset from the axis of the rod 37A. In this respect, the upper end 103A of the arm 103 is bent at a right angle with respect to the arm and loosely fits within aperture 105 formed within the plate 101. Member 107 maintains the end 103A of the arm within the aperture 105 but allows it to pivot therein. Enlarged end 103B is a small weight which is employed to maintain the lower end 103C of the arm normally pointing downward. Member 109 is a return spring having one end secured to the upper end of the plate 101 and the other end free but biased under tension against the lower surface of the top 73 of the wheel 31. Stop 111 limits counterclockwise movement of plate 101 and hence limits counterclockwise movement of housing 91 and core 93 as seen in FIGS. 10–12.

When the coil 47 is energized, plate 45 is moved upward to contact the lower end 103C of the arm and hence to move the arm 103 upward. This cocks the one-way clutch by rotating the plate 101 and hence the housing 91 clockwise as seen in FIG. 11. During the clockwise rotation of the housing 91, the core 93 remains in a stationary position relative to its threaded rod as illustrated by the position of the dot 97C in FIGS. 10 and 11. When the plate 45 moves downward and away from the arm 103, return spring 109 causes the plate 101 and the housing 91 and hence the core 93 to rotate in a counterclockwise direction as seen in FIG. 12. Note that the dot 97C has rotated counterclockwise a small amount in FIG. 12. Thus each time the plate 45 moves the arm 103 upward and allows it to return downward, its associated weight will be threaded radially outward on its rod a small distance. The spring 109 always returns the plate 101 to the same position shown in FIG. 10. Thus the amount of radial movement applied to a weight depends upon the amount of clockwise rotation applied to the plate 101. This depends upon the amount that plate 45 moves the arm 103 upward each time the coil 47 is energized.

As illustrated in FIGS. 8, 13, and 14, the plate 45 is arc shaped and has dimensions such that it is capable of contacting the control arms of two adjacent weights to move two adjacent weights radially outward simultaneously when the plate 45 is located below and within a certain range between two adjacent weights and when the solenoid coil 47 is actuated. When the high point 45A of the plate 45 is located directly below one of the control arms of a weight, it will be effective in moving only that control arm upward and hence its associated weight radially outward when the coil 47 is actuated. Due to the construction and arrangement of the system, only one weight will be moved radially outward when the wearer or carrier is traveling in a direction which is an integer multiple of 45° from magnetic north.

A system, depicted at 121 in FIG. 1, is employed repetitively to produce an output for actuating the coil 47 along the route of travel. The output produced is a function of the distance traveled. Thus each time the coil 47 is actuated by system 121, the weights above the plate 45 will be moved radially outward an amount which is a function of the distance traveled.

The system 121 for example may be a leg mounted distance measuring device or a commercially available "speedometer" attached to a boat and coupled to the water. A leg mounted distance measuring device is illustrated at 201 in FIG. 21 as being coupled to a person's leg. It is constructed in such a manner that when a person moves or travels a predetermined horizontal distance, a push button switch, 125 (see FIG. 1) is actuated temporarily to apply electrical energy from a power supply 127 to the solenoid coil 47 by way of electrical leads 129A and 129B which are adapted to be connected to the coil 47. The coil 47 thus is energized to move the plate 45 upward to radially move the weights above the plate 45 outward. The leg mounted distance measuring device employed will be described subsequently. When the system 29 is employed on a carrier such as a boat, a mechanism will be coupled to the output of the speedometer for actuating pushbutton switch 125 at predetermined intervals of distance traveled to energize the coil 47 and hence to move the plate 45 upward.

Thus as the person wearing the device or as the carrier traverses a path in different directions, the mount 51 and hence the coil 47 and plate 45 will change directions with respect to the wheel 31 which is maintained in a given azimuth by the magnetic north sensing device 43. As the plate 45 is positioned under different ones of the weights 41A-41H and as the coil 47 is actuated, the plate 45 will move these weights radially outward as a function of the distance and direction traveled. Thus information of distance and direction traveled is recorded on member 31 by moving selected weights radially outward. This is turn shifts the center of gravity of the member 31 as a function of the distance and direction traveled. Due to the bearing supports as described above, the shift in the center of gravity of the wheel 31 does not affect the function of the magnet 43 when shaft 33 is maintained in a generally vertical position.

The information representative of the resultant distance and direction traveled from a given departure point can be retrieved to allow one to determine the distance and direction back to the departure point. Retrieving of this information can be accomplished by turning the system 29 on its side to locate the shaft 33 in a generally horizontal plane as illustrated in FIGS. 2 and 22. When this is done and when the shaft 33 is aligned along the direction of magnetic north, the earth's magnetic field will be unable to control the position of the magnet 43 whereby the wheel 31 will rotate to a point of stable equilibrium dependent upon the net or resultant weight shift applied to the wheel 31 when the various weights were shifted radially outward as a function of the distance and direction traveled. By observing the wheel 31 in its new position of equilibrium, one can then determine quickly and accurately the direction which one must travel to return to the point of departure.

For example, assume one begins from a departure point DP as illustrated in FIG. 15 and travels in a southeast direction a certain distance D to a new point $P_1$. Assume also that the system 29 is strapped to a person and the device 201 is employed as the distance measuring device to actuate the solenoid coil 47. At the point of departure DP the weights 41A-41H all will be located adjacent the hub 35 whereby the wheel 31 will be in a balanced condition. This can be accomplished by manual adjustment of the weights as described above. The path of travel in the southeast direction is depicted at 131 in FIG. 15 and is 135° clockwise from magnetic north. While one is traveling in this southeast path, the front of the mount 51 and hence the plate 45 will face the southeast direction while the "north" position of the wheel 31 will be aligned with and hence face magnetic north. Assume that the "north" position of the wheel 31 and of the face plate 71 is such that support rod 37F and hence weight 41F will face magnetic north when the magnet 43 is aligned with magnetic north. Thus, only weight 41A will be located above the plate 45 in an effective position to be actuated by the plate 45 while traveling southeast. Note FIG. 8. Weight 41A will be moved outward radially an amount which is dependent upon the distance traveled in the southeast direction. The person then may turn the system on its side to locate the shaft 33 in a generally horizontal plane as indicated above. Since the weight 41A has been moved radially outward, the center of gravity of the wheel 31 has shifted toward the weight 41A whereby the wheel 31 is unbalanced and will rotate to a position of stable equilibrium. This position occurs with the weight 41A facing downward as illustrated in FIG. 16. By observing the angular information shown on upward position of the face 71, when acting as a scale, one will be informed as to the direction he must take in order to return to his departure point DP. For example, when wheel 31 is rotated to a position where weight 41A is located downward, the northwest position on the face plate 71 will be located upward. This informs the observer that he must travel in a northwest direction from $P_1$ to return to point DP.

If one travels in a direction which is at an angle other than an integer multiple of 45° from magnetic north, then the plate 45 will be below two adjacent weights and the plate will move both weights radially outward to record the distance and direction of travel on wheel 31. For example, assume that from the departure point DP, one travels a distance D to point $P_2$ which is 22.5° east of magnetic north. This path of travel is depicted by line 133 in FIG. 15. Along this path of travel, plate 45 will be located below weights 41F and 41G which will be aligned with magnetic north and 45° east of magnetic north respectively. As the coil 47 is repetitively actuated, plate 45 will contact the control arms of weights 41F and 41G to move them radially outward the same distance from the hub 35. This will shift the center of gravity toward the weights 41F and 41G. The distance that they are moved outward from the hub in this case, will be a function of ½(D) plus a small additional amount such that their resultant will lie along a radial line midway between the support rods 37F and 37G of weights 41F and 41G and will be a function of the distance D traveled along the path 133. The direction back to the departure point DP may be determined by turning the system 29 on its side to position the shaft 33 in a generally horizontal plane to allow the wheel 31 to act as a balance or scale as indicated above. The wheel 31 then will rotate to a position of stable equilibrium which occurs with weights 41F and 41G facing downward as illustrated in FIG. 17. The point midway between the south and southwest position on the face 71 will be located upward thus informing the observer that he must travel in a direction 202.5° clockwise from magnetic north to return to the departure point DP.

If the direction of travel is not an integer multiple of 45° nor of 22.5° from magnetic north, then the two adjacent weights below the plate 45 will be moved radially outward, but one of these weights will be moved radially outward more than the other. Their resultant will lie along a radial line between the support rods of the two weights at an angle closer to one weight than the other. It will have a magnitude which is a function of the distance traveled along the particular path. This will be described more thoroughly subsequently. Thus the present system is capable of recording on wheel 31 information representative of the distance and the path of travel in all directions.

Assume one traveled from DP to $P_1$ as described above but instead of returning to DP, assume one now travels northeast from $P_1$ to $P_3$ the same distance D. This path is depicted at 135 in FIG. 15.

The angle of travel from magnetic north from $P_1$ will be 45° east. While traveling in the northeast direction plate 45 will face the northeast direction while the north position of wheel 31 will be aligned with magnetic north. Thus only weight 47G will be located above the plate 45 in an effective position to be actuated by the plate. Along the path of travel 135 in the northeast direction, the weight 41G will be moved outward radially an amount which is dependent upon the distance D traveled in this direction. As indicated above, along the path of travel 131, weight 41A has moved radially outward an amount which also was dependent upon the distance D traveled in the southeast direction. Thus the wheel 31 has accumulated and stored information which is a function of the distance and direction of travel along paths 131 and 135. The wheel 31 when positioned to act as a balance or scale will quickly obtain the resultant of both weight shifts to allow one to rapidly and accurately determine the direction one must travel to return to the original departure point DP. In this respect to point $P_3$ the center of gravity of wheel 31 has shifted toward weights 41A and 41G. Thus when the system is turned on its side to position the shaft of wheel 31 in a generally horizontal plane and is aligned with magnetic north, the wheel 31 will rotate to a position of stable equilibrium which occurs with weights 41A and 41G facing downward as illustrated in FIG. 18. When weights 41A and 41G are located downward as illustrated in FIG. 18, the west position on the face plate 71 will be located upward. This will inform the observer that he must travel in a westward direction from $P_3$ to return to the departure point DP.

The above examples are but simple examples for explanation purposes and it is to be understood that the present system is capable of accumulating and storing information dependent on the distance and direction of travel as one traverses a complex path in many directions. Moreover, the system when acting as a balance or scale, is capable of quickly obtaining the resultant of all of the weight shifts occurring in all directions to allow one to rapidly and accurately determine the direction one must travel to return to the original point of departure.

If at any new point along the route of travel, one does not desire to return to the original departure point but desires to establish the new point as the base point to be returned to, one merely has to manually adjust the weights 41A-41H radially inward adjacent the hub 35 to "balance" the wheel 31 at the new base point.

Means also is provided for allowing one to determine the distance back to the departure point or to pre-set a destination into the wheel 31. Referring to FIGS. 4, 5, and 19, this means is identified at 141 and comprises an arm 143 secured to shaft 33 for rotation therewith but which may be adjusted manually to various angular positions around the shaft and relative to the wheel 31 and hence relative to the face plate 71. In this respect the arm 143 is secured to the shaft 33 by a relatively tight fit whereby it will hold a given or pre-set position relative to the shaft 33 and wheel 31 and hence will turn with wheel 31 when the system is acting as a balance to retrieve information. It may be adjusted manually to different positions relative to the wheel 31 by holding the wheel 31 stationary with one hand and moving the arm 143 around the shaft 33 to a desired position with the other hand.

Slidably secured to the arm 143 on one side of the shaft 33 is an adjustable weight 145. The weight 145 is secured to the arm 143 by a relatively tight fit but may be slid manually along the arm to a desired position between an inner limit at 147 and an outer limit 149. Post 147 forms the inner limit while post 149 extending from the top side of the arm 143 forms the outer limit. Formed on the top of the arm 143 are a plurality of lines 151 which are calibrated to represent distance thereby forming a distance scale. The inside edge 145A of weight 145 is adapted to be aligned with the various lines 151 to determine distance.

Secured in a fixed position to the other end of the arm is a weight 153. This weight counter-balances the combined weight of the arm 143 on the other side of the shaft 33 and the weight of the adjustable member 145 when it is located at its inner limit position 147 as illustrated in dotted form in FIG. 19. Thus in this position of the weight 145, the distance finding device 141 will be balanced on the shaft 33 and will not apply information of distance or direction into the wheel 31.

For use as a means for allowing one to determine the distance back to a departure point, the weight 145 will be located at its inner limit position 147 (at its balanced position) at the departure point. At the end of the route of travel, the arm 143 will be rotated manually relative to the wheel 31 to locate the pointer 143A in a direction opposite the direction of the net weight shift occasioned by radial movement of weights 41A-41H. Weight 145 then will move radially outward to counter-balance the net weight shift occasioned by radial movement of weights 41A-41H. At this counter-balanced position of weight 145, the position of the inner edge 145A of weight 145 relative to the scale 151 may be observed to allow one to read from the scale 151, the distance back to the departure point.

For example assume one travels southeast from DP to $P_1$ as described above. Prior to departure from DP, the weights 41A-41H will be moved adjacent the hub 35 and weight 145 will be moved to the inner limit position 147. Thus the wheel 31 will be balanced at DP. At $P_1$ weight 41A has moved radially outward whereby the northwest position of face plate 71 points upward when the system is turned on its side to act as a balance. Knowing the direction back to DP one may now determine the distance back to DP by holding the wheel 31 stationary and rotating the pointer 143A of arm 143 in the northwest direction relative to the face plate 71 and hence relative to the wheel 31. The weight 145 then will be moved outward manually along arm 143 until it counter-balances the weight shift occasioned by the new radial position of weight 41A. When this occurs, the wheel 31 will be balanced and will be in neutral equilibrium. Counter-balancing by weight 145 may be achieved by moving it outward in small increments and at each new position allowing the shaft 33 to rotate freely to determine whether the wheel is in neutral equilibrium. When neutral equilibrium of wheel 31 is achieved, the distance back to DP can be read from scale 151 by observing the position of inner edge 145A of weight 145 relative to the scale.

For use as a means for allowing one to pre-set a destination into the wheel prior to the departure, one merely has to position the arm 143 on the wheel 31 in a direction opposite the desired direction of travel and then move the weight 145 outward to a distance representative of the distance desired to be traveled in the desired direction. The position to which the weight 145 will be moved may be determined by the distance scale 151.

For example again assume that one starts from the departure point DP and desires to go southeast a distance D to point $P_1$. Assume that the distance D is equal to one mile. Prior to departure, one will adjust the weights 41A-41H adjacent the hub 35 and then position the arm 143 whereby its pointer 143A points toward the northwest direction. The weight 145 then will be moved outward to the "one mile position" as indicated by the scale 151. As one travels in the southeast direction toward point $P_1$, the weight 41A will be moved radially outward and at point $P_1$ it will counter-balance the weight shift occasioned by location of the weight 145 radially outward in the northwest direction relative to the wheel 31. If the path of travel is correct, and one does reach point $P_1$, then the wheel 31 will be in neutral equilibrium.

Assume however that one through error travels one mile due east from a departure point DP and arrives at point P₄. See FIG. 15. At this point, weight 41H will have been moved out radially a distance which is a function of the distance traveled. Since the weight 145 previously had been moved outwardly in the northwest direction relative to the wheel 31, when the wheel 31 is turned on its side to act as a balance, the stable point of equilibrium will occur with the east and the northwest position of the face plate 71 facing downward. The point mid-way between the south and southwest positions of the face plate will be pointing upward thus indicating to the traveler that from point P₄ one must travel in a direction 202.5° clockwise from magnetic north to reach point P₁.

Figure 20:
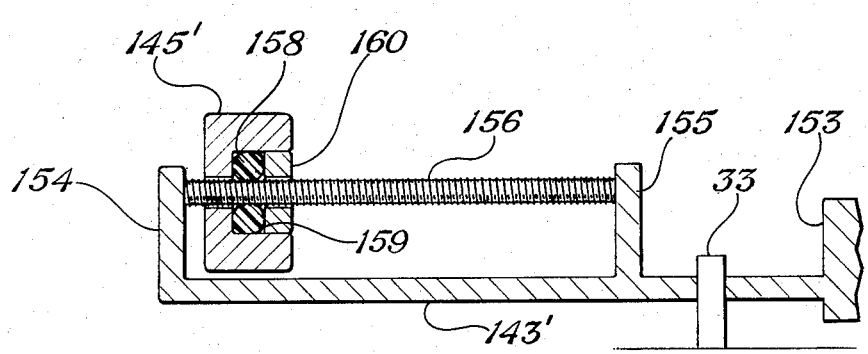
FIG. 20 is a modified distance finding and determining mechanism.

FIG. 20 illustrates a modified arm 143' which has posts 154 and 155 extending therefrom for supporting a threaded rod 156. Coupled to the rod 156 is a modified weight 145'. It is annular shaped and has a resilient O-ring 158 tightly fitted between its inside walls 159 and the threaded rod 156. An annular insert 160 holds the O-ring 158 in place. The O-ring is pressed tightly against the inside walls 159 to prevent slipage between the O-ring and the weight 145'. In addition it is pressed tightly against the threaded rod 156 and into its threads whereby it in affect acts as a threaded member to allow the weight 145' to be threaded inward or outward on the rod 156. This allows the weight 145' to be adjusted precisely relative to the scale 151 on the arm 143' to determine the distance back to the departure point or to pre-set information into the wheel 31. With this arrangement, the weight 145' may be slid relative to the threaded rod 156 by applying radial force to the rod to move the weight 145' roughly to the desired position after which it may be adjusted precisely by rotation. The weight 145' may be slid relative to the threaded rod 156 by radial force due to the resiliency of the O-ring 158 which allows the O-ring to slide over the threads of the rod 156 when radial force is applied to the weight.

Referring again to FIGS. 10, 13, and 14, there will be described the manner in which plate 45 is constructed in order to apply the correct information representative of distance and direction of travel to the wheel 31 when the plate 45 is moved upward to contact the control arms of the weights of the wheel. Curved inner and outer ends 45F and 45G are arcs of circles having shaft 33 as their center. Edges 45E and 45E' when extended, form a right angle with each other. The plate 45 has points of constant height along contour lines 45A, 45B, 45B', 45C, 45C', 45D, 45D', 45F, and 45F'. Along line 45A, the height of the plate 45 is a maximum and decreases outward from each side of this line. Between adjacent contour lines, the height of the plate is a smooth transition between the height at adjacent contour lines. Each of the contour lines is parallel to a radial line extending from axis 33 but offset therefrom. Note for example that line 45C' is parallel but offset from radial line 165. This offset corresponds with the offset between each control arm and its rod axis. In one embodiment, this offset is one-fourth of an inch.

The decimal numbers next to the contour lines in FIGS. 13 and 14 indicate the height, in inches, of the contour lines above the base 45H of the plate. The dotted line 45J represents a plane which is 1/16 of an inch above the base 45H. Thus the top surfaces of the plate along lines 45E, 45D, 45C, 45B, 45A, 45B', 45C', 45D', and 45E', have heights in inches above the plane 45J respectively of 0.0, 0.0376, 0.0675, 0.0956, 0.1250, 0.0956, 0.0675, 0.0376, and 0.0.

The plate 45 is moved upward a fixed amount of one-eighth of an inch when the coil 47 is energized. When this occurs, the contour surfaces 45E, 45D, 45C, 45B, 45A, 45B', 45C', 45D', and 45E' will be moved above the normal level of surface 45A by amount in inches equal respectively to 0.0, 0.0376, 0.0675, 0.0956, 0.1250, 0.0956, 0.0675, 0.0376, and 0.0. In FIG. 10 the normal level of surface 45A is illustrated by line 160. Each control arm 103 is located such that its lower end 103C will extend to the level of the contour surface 45A of the plate 45 with slight clearance therebetween when the plate 45 is at its low point next to the base 53 when the coil 47 is unenergized. Hence a control arm, when directly above any one of the contour surfaces 45E, 45D, 45C, 45B, 45A, 45B', 45C', 45D', 45E' will be moved upward (when coil 47 is energized) an amount in inches equal respectively to 0.0, 0.0376, 0.0675, 0.0956, 0.1250, 0.0956, 0.0675, 0.0376, and 0.0. When the control arm is above a point intermediate any one of the above contour lines or surfaces, the control arm will be moved upward an amount dependent upon the height of the point of contact of the top surface of the plate intermediate the contour lines.

As a weight is moved radially outward while a person or the carrier is traveling in a straight path, the control arm of the weight will follow a straight line path above the plate 45 from its inner edge 45F to its outer edge 45G. Since the control arm 103 is offset from the axis of the rod along which its weight moves, its control arm will follow a path offset but parallel to the rod axis and hence offset but parallel to the radial line from the shaft 33 coinciding with the rod axis. Thus as the coil 47 is repetitively energized while the person or carrier is traveling in a straight line, the control arm of a weight will be moved upward a constant amount each time the plate moves upward regardless of the position of the weight along its support rod.

For example, assume that the path of travel is southeast. The plate 45 will face a direction such that the rod 37A will be located in a position to coincide with a radial line 161 extending from shaft 33. As the weight 41A is moved radially outward along line 161, the lower end 103C of the control arm 103 will follow a path which will be above line 45A of plate 45 which is its high point. Thus as the weight 41A is moved radially outward, the arm 103 will be moved upward a constant amount equal to one-eighth of an inch each time that the coil 47 is energized while traveling in the southeast direction.

As a further example, assume that the path of travel of the person or carrier is in a direction such that the plate will be positioned to locate the rod 37G of weight 41G along a radial line 163. As the weight 41G is moved radially outward along line 163, the lower end 103C of its control arm 103 will follow a path which will be above contour line 45C. Each time the coil 47 is energized the arm 103 will be moved up a constant amount equal to 0.0675 of an inch.

As indicated above, the amount of radial movement applied to a weight each time the plate 45 is moved upward depends upon the amount that the plate 45 moves the weight's control arm 103 upward. While traveling in a straight line path, it is desirable to move the weight's control arm upward a constant amount in order to move its weight radially outward an amount representative of the distance traveled along the straight line path. In this respect, the distance measuring system 201 is constructed such that it actuates the switch 125 to energize the coil 47 only when the distance traveled reaches a predetermined amount. In one embodiment as described above, it will actuate the switch 125 each time the person on foot travels a horizontal distance of 25 feet. Thus a constant amount of distance information is supplied into the system 29 each time the coil 47 is energized.

As indicated above, the plate 45 moves upward one-eighth of an inch each time the coil 47 is energized. Maximum radial movement of a weight is achieved upon actuation of the coil 47 only when the high point 45A of the plate is below the lower end of the control arm of a weight. In this position, the high point 45A of the plate 45 will move the control arm upward a maximum amount (one-eighth of an inch) when the coil is energized. One-eighth of an inch upward movement of a control arm will cause its weight to be shifted radially outward an amount representative of 25 feet of distance of travel.

The system is assembled and constructed such that the high point 45A of the plate 45 will be located directly below the lower end of the control arm of a weight when the direction of travel is an integer multiple of 45° from magnetic north. Thus while traveling in one of these directions, the plate 45 will move the corresponding weight's control arm upward one-eighth of an inch when the coil 47 is energized and hence will apply 25 feet of distance information (radial shift) to its weight.

For the purpose of further understanding, the amount of radial shift applied to a given weight is proportional to the distance its control arm is moved upward. For example if a control arm is moved upward 1/16 of an inch, its weight will be shifted radially an amount representative of 12.5 feet.

The plate 45 has dimensions between its edges 45E and 45E' such that when the high point 45 is directly below the lower end of a given control arm, the plate cannot contact the control arms of the two adjacent weights. Thus when the high point 45A of the plate 45 is below the lower end of a given control arm, only its weight will be moved radially outward when coil 47 is energized.

When traveling in a direction which is not an integer multiple of 45° from magnetic north, the high point 45A of the plate 45 will be between two adjacent control arms. These two control arms will be moved upward when the plate is moved upward as the coil 47 is energized. Their upward movement however will be an amount less than maximum (less than one-eighth of an inch) whereby their weights each will be moved outward by an amount which is less than maximum. The amount of upward movement of the two control arms will depend upon the height of the plate at the points of contact with the two adjacent control arms. The height of the plate 45 on each side of its high point 45A is such that the amount of radial shift applied to each of two adjacent weights, when coil 47 is energized, will be representative of less than 25 feet but sufficient such that their resultant weight shift will have a magnitude representative of 25 feet and will extend in a direction relative to the wheel 31 representative of the correct direction of travel.

As indicated above, the contour surfaces 45E, 45D, 45C, 45B, 45A, 45B', 45C', 45D', 45E', have heights in inches above the plane 45J respectively of 0.0, 0.0376, 0.0675, 0.0956, 0.1250, 0.0956, 0.0675, 0.0376, and 0.0. The plate 45 is constructed such that these heights are a function of the direction of travel relative to the weights and their support rods. The heights of the contour surfaces above plane 45J may be calculated from the following equations:

$$X = M/\cos\phi \, (\alpha - \phi/\alpha) \qquad (1)$$

Wherein:
- X is the height of the contour surfaces above plane 45J;
- M is the maximum height of the contour surface 45A above plane 45J;
- $\alpha$ is the angle between adjacent support rods (45° in the preferred embodiment); and
- $\phi$ is the direction or angle of travel relative to a given support rod when its weight's control arm is located above plate 45.

For example, if the direction of travel is midway between two support rods, $\phi$ will be equal to 22.5° from each support rod. In this case, plate 45 will be located such that the support rods of two adjacent weights will coincide with radial lines 163 and 165 respectively relative to plate 45. Assume that rods 37G and 37F coincide with these lines respectively. Thus these support rods each will be located at an angle of 22.5° from radial line 161 which is the position in which a support rod must be located in order to place its control arm above contour surface 45A. When support rod 37G is located along radial line 163, the control arm of its weight then will be located above contour surface 45C. Similarly when control rod 37F is located along radial line 165, the control arm of its weight will be located above contour surface 45C'. Hence contour surfaces 45C and 45C' will be effective to shift two adjacent weights when the direction of travel is midway between their support rods. The relationship of the heights of surfaces 45C and 45C' above plane 45J relative to the direction of travel may be calculated as follows:

$$X = 0.1250/\cos 22.5 \, (45 - 22.5/45) = 0.0625/\cos 22.5$$
$$= 0.0677$$

which is approximately equal to 0.0675.

In the above example, where the direction of travel is midway between the support rods 37G and 37F, and when coil 47 is energized, contour surfaces 45C and 45C' of plate 45 will move the control arms of weights 41G and 41F upward an equal amount (0.0675 of an inch each) to apply equal amounts of distance information (radial shift) to their weights. This is necessary in order to obtain a resultant weight shift midway between their support rods 37G and 37F. The amount of distance information applied to each of weights 41G and 41F in order to obtain a resultant weight shift midway between their support rods and representative of 25 feet will be proportional to the amount of upward movement of their control arms and to the height of the top of the plate 45 above plane 45J at the points of contact with the control arms. Hence the amount of distance information necessary to be applied to each weight affected by plate 45 when actuated, to obtain a resultant of 25 feet, can be determined from equation (1) wherein:

X is the distance information (represented by the radial shift) applied to a given weight;

M is the maximum distance information or radial shift (representative of 25 feet) which can be applied to a weight when the coil 47 is energized; and $\alpha$ and $\phi$ are defined as above.

Thus when traveling midway between two support rods, the amount of distance information applied to each weight to obtain a resultant weight shift midway between their control rods and representative of 25 feet will be X = 25/cos 22.5 (45 − 22.5/45)= 12.5/cos 22.5 = 13.52 feet Surfaces 45C and 45C' will cause each of weights 41G and 41F to move outward radially an amount representative of 13.25 feet of travel.

The solution of equation (1) for the height of the contour surface and for the distance information applied to a weight is the solution of the hypotenuses of two right triangles. Since the distance information applied to a given weight is proportional to the height of the contour surface affecting radial movement of the weight, the right triangles are proportional and equation (1) can be employed to determine both values.

If the direction of travel is not an integer multiple of 22.5° from magnetic north, then two adjacent weights also will be moved radially outward however the plate 45 will correctly apply more distance information (radial shift) to one of the weights than to the other whereby the resultant weight shift will lie between the support rods of the two adjacent weights but to one side of a radial line extending midway between the two support rods. For example, if one is traveling 10° east from magnetic north, then the high point of the plate 45 will be closer to the control arm of weight 41F whereby its control arm will be moved upward an amount greater than the upward movement of the control arm of weight 45G. Thus more distance information will be applied to weight 45F than to weight 45G. The distance information (radial shift) applied to each of these weights will be less than 25 feet but sufficient such that their resultant weight shift will have a magnitude representative of 25 feet and will lie along a radial line relative to the wheel 31 which is representative of 10° east of magnetic north. The amount of distance information (radial shift) applied to each of the weights in this case can be determined from equation (1).

In one embodiment, each of the radial support rods 37A-37H have 104 threads per inch and each of the weights 41A-41H are capable of moving a distance of three-eighths of an inch radially on their support rods. This radial distance is calibrated to represent approximately three miles of distance traveled. It is to be understood that the system could be modified to employ a different number of weights located at equal angles around the hub 35. For example 16 weights instead of 8 could be used.

Referring now to FIGS. 3 and 21-23, the guidance system when used by the person on foot is attached by a Gimbal arrangement to a belt adapted to be strapped around the person's waist. The Gimbal support comprises a U-shaped support 171 pivotally coupled to a mount 173 by way of a pivotal connection 175. The mount 173 in turn is connected to the belt 177 by way of rivets or brads 179. Posts 181 and 183 of the mount 51 are pivotally connected to the ends of the U-shaped support 171. These posts are attached to the underside of the upper base 53. One pivotal connection is illustrated at 185. Thus the Gimbal support will allow the system 29 to pivot in all directions while the person is walking to maintain the shaft 33 in a generally vertical position. When it is desired to employ the system as a balance or scale for example to determine the direction back to the departure point, one merely has to pivot the system 29 about axis 175 to locate the shaft 33 in a generally horizontal position as illustrated in FIG. 22. An upper frame 187 having a glass top 189 is coupled to the mount 173 to protect the system 29 against wind and rain while being used.

Figure 24:
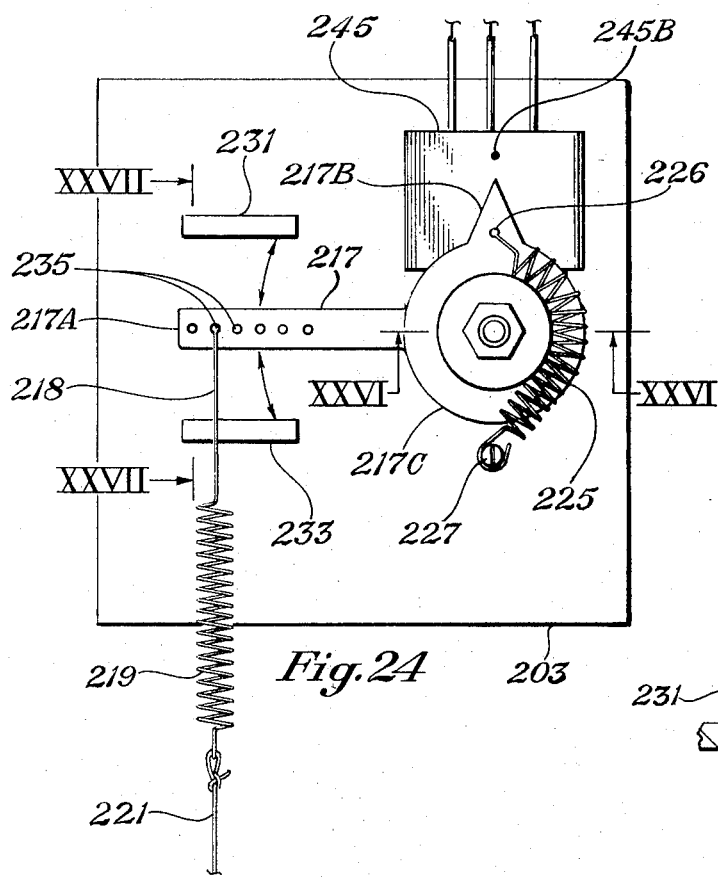
FIG. 24 is a plan view of the leg mounted distance measuring device with its protective covering removed.
Figure 26:
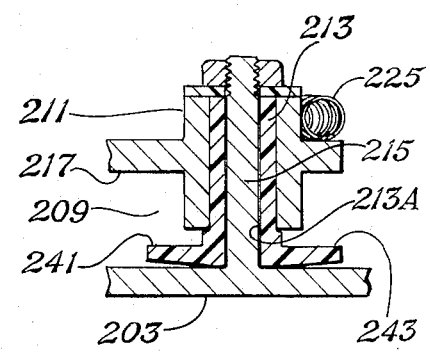
FIG. 26 is a cross-sectional view of FIG. 24 taken through the lines 26—26.
Figure 27:
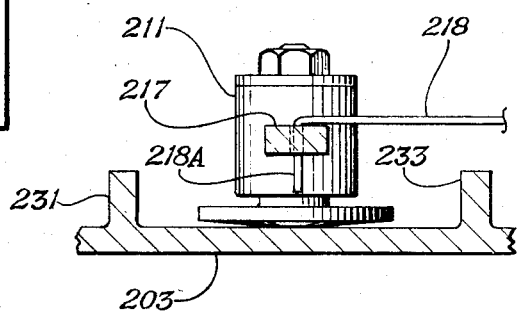
FIG. 27 is a side view of FIG. 24 taken along the lines 27—27 thereof.
Figure 28:
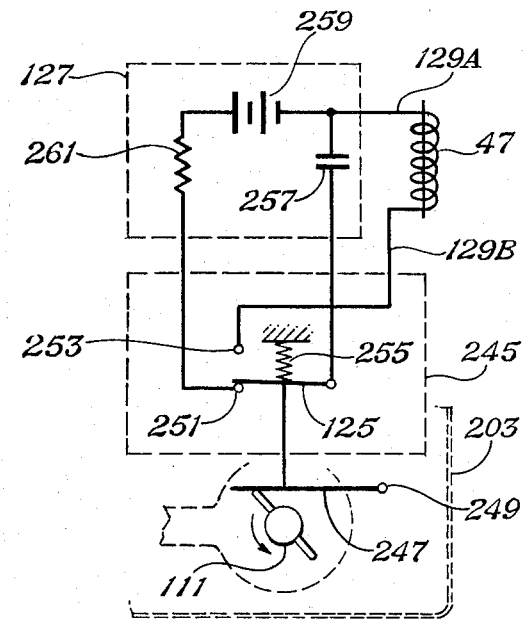
FIG. 28 illustrates the electrical system of the leg mounted distance measuring device when employed in combination with the guidance system.

Referring now to FIGS. 21, 23, and 24-28, there will be described the distance measuring device 201. It comprises a mount 203 secured to a strap 205 which is adapted to be attached to a person's leg above the ankle illustrated at 206. A protective cover 207 is provided around the mount 203. Secured to the mount 203 is a one-way clutch comprising a housing 211 which surrounds a core 213. A rod 215 is connected to the mount 203 and extends through a bore 213A formed through the core 213 for supporting the one-way clutch. A relatively tight fit exists between the rod 215 and the bore 213A. Secured to the housing 211 is a control arm 217 for rotating the housing. The housing 211 has interior ramps and rollers (not shown) which allow the housing to turn freely in one direction relative to the core and then to "lock up" to the core to turn the core with the housing as the housing is turned in the opposite direction. It is of the same type referred to in connection with FIG. 9 and identified at 91. The core 213 is adapted to be rotated only in the counterclockwise direction as seen in FIGS. 24 and 28. The housing 211 is rotated in a clockwise direction to set or cock the housing. When this occurs, the core 213 remains stationary and does not rotate. When the arm 217 and hence the housing 211 is rotated in a counterclockwise direction, it rotates the core 213 counterclockwise on the support rod 215 an amount depending upon the amount of clockwise and counterclockwise rotation applied to the arm 217 and hence to the housing 211.

Figure 25:
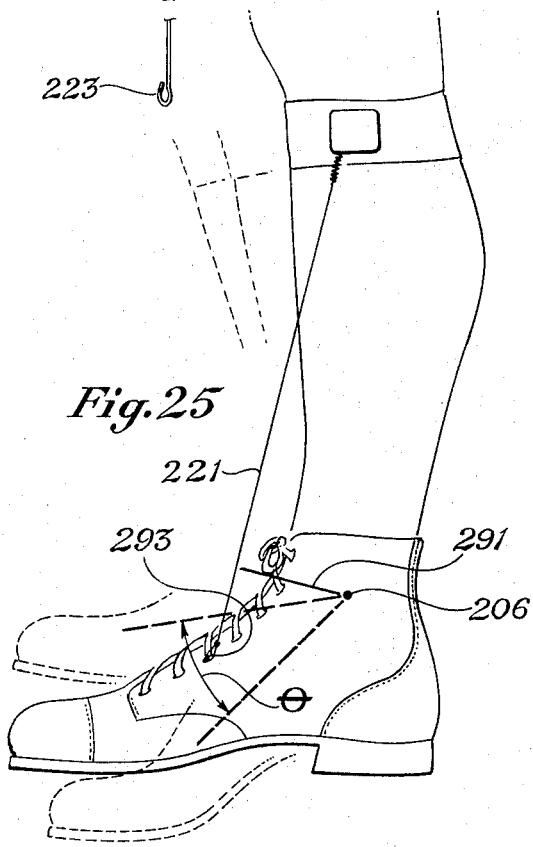
FIG. 25 shows the change in angular relationship between the foot and the leg as a person takes a step.

Connected to one end 217A of the arm 217 by way of a hook 218 and a spring 219, is a flexible cord 221. A hook 223 is connected to the other end of the cord 221 to allow the cord 221 to be connected to a person's shoe as illustrated in FIGS. 21 and 25 and hence to the person's foot offset from the ankle 206. A return spring 225 is connected at 226 to a pointer 217B extending from the base 217C of the arm 217 and to a post 227 which in turn is connected to the mount 203. As a person walks, his foot turns about the ankle as illustrated in FIG. 25. Each time the foot swings downward about the ankle, the cord 221 pulls the arm 217 downward whereby the arm 217 is rotated counterclockwise. This in turn rotates the housing 211 and hence the core 213 counterclockwise. As the person finishes the step, he will move or swing his foot upward about the ankle thereby allowing the return spring 225 to rotate the arm 217 and hence the housing 211 in a clockwise direction. This sets or cocks the housing 221 to make it ready for rotating the core 213 on the next step. In this manner, each time the person takes a step, the core 213 is rotated a small amount counterclockwise depending upon the amount of clockwise and counterclockwise movement applied to the arm 217 while taking a complete step.

Stops 231 and 233 are connected to the mount 203 to limit clockwise and counterclockwise movement of the arm 217. As seen in FIG. 27, the arm 217 is capable of passing above the stops 231 and 233 however the bent end 218A of the hook 218 extends to a level below the top edges of the stops 231 and 233 whereby it will make contact with the stops 231 and 233 and limit movement of the arm 217 as it is swung or pivoted above the stops. Apertures 235 are provided in the end 217A of the arm 217 for adjustment purposes to allow the hook 218 and hence the cord 221 to be connected to the arm 217 at different radial positions depending on the height of the person.

The stop 233 does not affect or limit rotation of the foot about the ankle since the spring 219 allows the foot to swing downward about the ankle through its full range even though stop 233 may limit downward movement of the arm 217. Spring 219 is a relatively stiff spring and is not stretched while the arm 217 is pulled downward to stop 233. Beyond this point, the spring 219 will stretch to allow the foot to continue to rotate downward about the ankle as a person takes a step.

Connected to the core 213 are two arms 241 and 243 which rotate counterclockwise when the core 213 is rotated counterclockwise. Also secured to the mount 203 is a switching system 245 which is more clearly shown in FIG. 28. This system includes an arm 247 pivotally connected at 249 to mount 203. Also included are two terminals 251 and 253 and the push button switch 125 which normally is biased by a spring 255 in contact with terminal 251. In this position a capacitor 257 is charged from batteries 259 through resistor 261. In a complete cycle of rotation of the core 213, each arm 241 and 243 will contact and move the arm 247 against the push button switch 125 to urge it in contact with terminal 253. Each time switch 125 contacts terminal 253, capacitor 257 is discharged through solenoid coil 47 by way of electrical leads 129A and 129B. Upon a complete rotation of the core 213, the solenoid coil 47 thus will be actuated twice to apply distance information to the guidance system 29 as described above. As shown in FIG. 23, a pouch 177A is connected to the belt 177 for holding the capacitor 257, the batteries 259, and the resistor 261.

Referring now to FIGS. 29–32, there will be described the various motions about the ankle that a person's foot undergoes while walking and the manner in which the distance measuring device 201 employs the foot's movement about the ankle to produce an output which is a function of the distance traveled. For use with the guidance system 29, the device 201 will produce an output dependent upon the horizontal distance moved or traveled whether the person is walking along a horizontal or sloping path.

Figure 30:
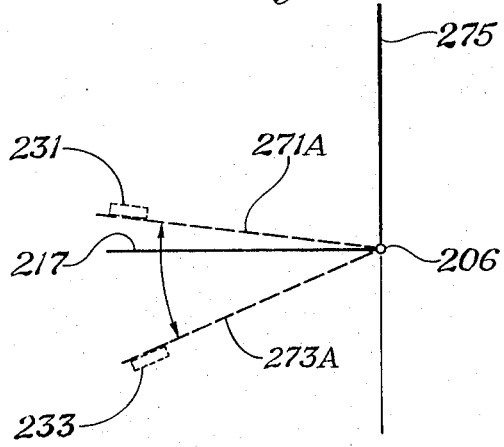

While walking along a horizontal path, the foot generally works or swings through a given angle or range relative to the leg depending upon the characteristics of the person. In FIG. 29, lines 271 and 273 illustrate the limits of this range relative to the leg depicted at 275. The ankle is depicted by circle 206. The angle $\theta_1$ defines the upper limit 271 to which the foot moves relative to the leg while the angle $\theta_2$ defines the lower limit 273 to which the foot moves relative to the leg while taking a step. The angle through which the foot turns is identified by $\theta$. It is to be understood that the leg will not remain vertical but will also be moved through different angles as one takes a step. The foot however will still move between the limits 271 and 273 relative to the leg 275 as one takes a step. The cord 221 and return spring 225 are adjusted and set for each person such that along a horizontal path of travel, the foot and hence cord 221 and the return spring 225 will turn the arm 217 through the same angular range $\theta$ while a person takes a normal step. Lines 271A and 273A in FIG. 30 illustrate the limits of this range. Stops 231 and 233 are located such that they will effectively coincide with these limits. Thus while walking along a horizontal path, the arm 217 will follow the movement of the foot relative to the leg to rotate the core 213 and hence the arms 241 and 243 counterclockwise a small amount each time the person takes a step. If the distance covered by each step is constant, than the amount of incremental rotation of the core 213 also will be a constant for each step. Thus each time the solenoid coil 47 is actuated, the person will have traveled a certain distance.

In one embodiment, the device 201 is calibrated and adjusted whereby the core 213 will turn one-half revolution when a person walks 25 feet over level or horizontal ground. Thus a complete revolution of the core 213 is representative of 50 feet traveled over level ground. Over this distance, the solenoid coil 47 will be actuated twice, each actuation being representative of 25 feet traveled over level ground. Preferably, the device 201 will be adjusted and calibrated such that the core 213 will rotate two complete revolutions when a person moves 100 feet horizontally whether walking over hilly or level terrain. This will be described subsequently.

When a person walks up a hill or down a hill, he takes shorter steps and hence more steps than while walking the same distance along a horizontal path. Moreover, the number of steps taken while going down a hill generally are more than the number taken while going up a hill of the same slope. For example, I have found that it takes me 100 steps to walk a certain distance over level ground. While walking up a hill at a given slope over the same sloping distance, it takes me 125 steps. On the other hand, while walking down a hill of the same slope and over the same sloping distance, it takes me about 140 steps. Thus shorter steps are taken to cover the same distance while walking up or down a hill than while walking over level ground.

Figure 31:
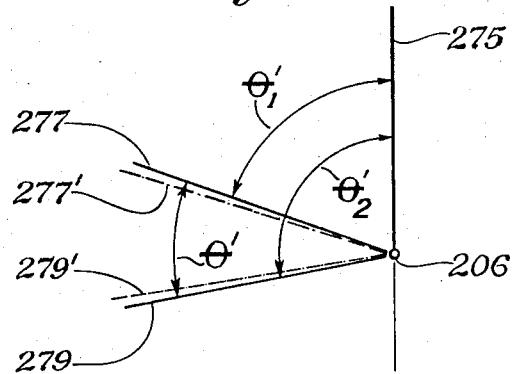
Figure 32:
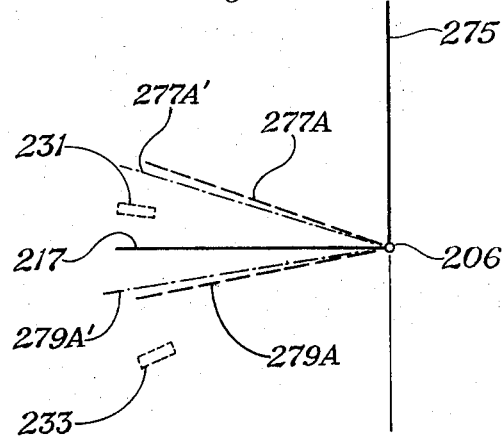

While walking up or down a hill, I have also found that the range through which the foot works or swings, shifts, relative to the leg. This is due to the tendency of a person to remain in an upright or vertical position while walking up or down a hill while the foot follows the slope of the hill. As seen in FIGS. 31 and 32, the shift in range is illustrated as being clockwise while going up or down a hill. For example referring to FIG. 31, the limits of the range through which the foot swings relative to the leg 275 while going up a hill are illustrated by lines 277 and 279. The angle $\theta_1'$ will be less than $\theta_1$ while $\theta_2'$ will be less than $\theta_2$ whereby the shift in range will occur. Moreover $\theta'$ may be slightly less than $\theta$. Again, it is to be understood that the leg will not remain vertical but will also be moved through different angles as one takes a step. The foot however will still move between the limits 277 and 279 relative to the leg as one takes a step while going uphill. While walking uphill, if the arm 217 were allowed to follow the shifted range through which the foot works or swings, then the arm 217 would rotate between upper and lower limits illustrated by lines 277A and 279A in FIG. 32. The upper stop 231 however limits clockwise movement of the arm 217 while going up the hill and prevents it from reaching the limit 277A. Moreover, at the end of the step, the cord 221 will not pull the arm 217 the full distance to the other stop 233 due to the range shift which the foot undergoes while walking up a hill. Thus, while walking up a hill, the arm 217 and hence core 213 will be rotated through a smaller angle for each step taken. Thus, more steps will be required to rotate the core 213 a complete cycle while going uphill than are required to rotate the core 213 a complete cycle while walking along a horizontal path. Hence more steps will be required to be taken before the coil 47 is actuated.

This is also true when a person walks down a hill. For example referring again to FIGS. 31 and 32 the range through which the foot turns relative to the leg while walking downhill is illustrated by dotted lines 277' and 279'. This range may be slightly less than $\theta'$ and the shift will also be clockwise. The clockwise shift which occurs while walking downhill is due to the fact that the leg is rotated or moved over the foot a substantial amount when taking and completing a step to maintain ones balance and to remain upright. While walking downhill, if the arm 217 were allowed to follow the shifted range through which the foot travels, then the arm 217 would rotate between upper and lower limits illustrated by lines 277A' and 279A' in FIG. 32. The upper stop 231 however limits clockwise movement of the arm 217 while going downhill and prevents it from reaching the limit 277A'. Moreover, at the end of the step, the cord 221 will not pull the arm 217 the full distance to the other stop 233 due to the range shift which the foot undergoes while walking downhill. Thus, while walking downhill, the arm 217 and the core 213 will be rotated through a smaller angle for each step taken. Thus more steps will be required to rotate the core 213 a complete cycle while going downhill than are required to rotate the core 213 a complete cycle while walking along a horizontal path.

Hence as the relative angle between the leg and the foot varies relative to the stop 231 while walking uphill or downhill, the stop 231 and the effect of the range shift act to reduce the incremental rotation of the core 213 for each step taken. While walking along a sloped path, more steps will be required to be taken before the arms 241 and 243 actuate the solenoid coil 247. Hence the information derived from coil 47 will be a more accurate representation of the distance moved or traveled when walking over different types of terrain.

For use with the guidance system 29, the device 201 is adjusted and calibrated such that when one walks over a sloped path, the distance information derived from the coil 47 is representative of the average horizontal distance one moves while walking along the sloped path. This horizontal distance in affect is equal to the actual distance walked along the slope times the cos. of the angle of the slope relative to the horizontal. The horizontal distance when applied to the guidance system 29, allows it to more accurately record and retrieve direction and distance from a given departure point. The distance back to the departure point as retrieved from the system 29 hence will be the horizontal distance rather than the actual distance one will travel while walking up or down hills.

In the preferred embodiment the device 201 will be adjusted and calibrated such that the core 213 will be rotated two complete cycles while walking 100 feet over level ground or while walking over a hilly path which covers a horizontal distance of 100 feet. The length of the arm 217 from its far end 217A to its pivot point about rod 215 is about 1 1/16 of an inch. The cord 221 including its hooks 218 and 223 and the spring 219 while unstretched has a length of about 1 foot. While standing in a perfectly vertical position on level ground, the position of the mount 203 is adjusted in the embodiment shown such that the arm 217 extends horizontally from its pivot point. Pointer 217B is employed to assist in making this adjustment. In this respect pointer 217B will point to a mark illustrated at 245B when the arm 217 extends horizontally. At this position, the distance from the top of the arm 217 to the lower edge of the stop 231 preferably will be less than the distance from the lower edge of the arm 217 to the top edge of the stop 233. The arm 217 preferably is located further from stop 233 than from stop 231 since it has been found that the foot swings downward a greater angle than it swings upward relative to the horizontal when a person takes a step along a horizontal surface. In order to obtain two complete cycles of the core 213 per 100 feet, the cord 221 may be coupled to the shoe at a position 293 whereby the perpendicular distance 291 (see FIG. 25) from the cord to the ankle is about 1 inch. The stops 231 and 233 also will be located at positions relative to the horizontal position of arm 217, when the mount 203 is strapped to the leg, sufficient to obtain the desired two complete cycles of core 213 per 100 feet of horizontal distance moved when walking over different types of terrain. In FIG. 25 the angle $\theta$ represents the angle which the connection point 293 swings relative to the ankle as one takes a step along a horizontal path. This angle corresponds with the angle $\theta$ of FIG. 29.

It has been found that while walking over rough but level ground as well as over slick and wet level ground, the foot pivots about the ankle relative to the leg more than it does while walking over smooth but level dry ground. Thus the relative movement between the foot and the leg over rough or slick but level ground is different from that which occurs while walking over smooth but level dry ground. Both of stops 231 and 233 however act to eliminate the effect of this additional movement to allow the device to produce the same output (i.e., two cycles or rotation of core 213 per 100 feet) whether walking along a rough or slick level path or along a smooth dry level path over the same distance.

Although in the embodiment disclosed, stop 231 was described as being located to coincide with the upper limit (271A) of the angle of the normal step, it may be located closer to stop 233 and still produce satisfactory results. Moreover it is to be understood that the stops 231 and 233 as well as the arm 217 may be modified and adjusted to various combinations of positions on the mount 203 and still obtain satisfactory results.

The distance measuring device 201 also is described and claimed in my copending U.S. Pat. application entitled "Leg Mounted Distance Measuring Device and Guidance System," Ser. No. 291,776, filed on the same date as the present application, now abandoned.

I claim:
1. A device for recording distance and direction of travel as it is moved along a course of traverse relative to a given point comprising:
   support means,
   rotatable means coupled to said support means for rotation about an axis of rotation relative to said support means,
   a plurality of radially extending supports coupled to said rotatable means at different angular positions about the axis of rotation of said rotatable means for rotation therewith,
   weight means coupled to each radial support for movement to positions between said axis of rotation and a given perimeter outward from said axis of rotation, and
   means for moving selected ones of said weight means to positions between said axis of rotation and said given perimeter dependent upon the distance and direction of travel with said device,
   said support means being adapted to be positioned to allow said axis of rotation to be located in a generally horizontal position to allow said rotatable means to rotate to a position of stable equilibrium dependent upon the resultant weight shift applied to said rotatable means by the movement of said weight means between said axis of rotation and said given perimeter.

2. A device for recording distance and direction of travel as it is moved along a course of traverse relative to a given point comprising:
   support means,
   rotatable means coupled to said support means for rotation about an axis of rotation relative to said support means,
   a plurality of radially extending supports coupled to said rotatable means at different angular positions about the axis of rotation of said rotatable means,
   weight means coupled to each radial support for movement to positions between said axis of rotation and a given perimeter outward from said axis of rotation,
   azimuth finding means adapted to be aligned with a predetermined azimuth as the device is moved, and
   means responsive to said azimuth finding means and to an input which is dependent upon the distance of travel for moving selected ones of said weight means to positions between said axis of rotation and said given perimeter as a function of the distance and direction traveled with said device,
   said support means being adapted to be positioned to allow said axis of rotation to be located in a generally horizontal position to allow said rotatable means to rotate to a position of stable equilibrium dependent upon the resultant weight shift applied to said rotatable means by movement of said weight means between said axis of rotation and said given perimeter.

3. A device for recording distance and direction of travel as it is moved along a course of traverse relative to a given point comprising:
   support means adapted to be moved along a course of traverse,
   rotatable means coupled to said support means for rotation about an axis of rotation relative to said support means,
   said rotatable means includes hub means, whose center coincides with said axis of rotation, and a plurality of radially extending supports coupled to said hub means at different angular positions relative to the center of said hub means,
   weight means supported for radial movement by each radial support,
   azimuth finding means adapted to be aligned with a predetermined azimuth as said device is moved,
   said azimuth finding means comprising magnetic means rotatably supported about an axis for alignment with magnetic north when the axis of said magnetic means is supported in a generally vertical position,
   said rotatable means being connected to said magnetic means for movement therewith for aligning a given position of said rotatable means with magnetic north as said magnetic means is aligned with magnetic north, and
   control means supported by said support means at a fixed position relative to the axis of rotation of said rotatable means for moving said weight means radially in response to signals dependent upon the distance traveled as said control means is moved near individual ones of said weight means as said support means is turned in different directions.

4. The device of claim 3 wherein:
   said magnetic means and said rotatable means have the same axis of rotation formed by a common shaft means,
   said device is adapted to be supported in a position to locate the axis of rotation of said magnetic means and said rotatable means in a generally horizontal position to render said magnetic means ineffective as a magnetic north finding means and to allow said rotatable means to be rotated to a point of stable equilibrium dependent upon the resultant weight shift occurring and resulting from the radial positions to which said weight means are moved.

5. The device of claim 4 wherein:
   said plurality of radially extending supports are equally spaced apart about said axis of rotation of said rotatable means,
   the angle between said adjacent radial supports being defined as $\alpha$,
   each weight means comprises a two-way rotatable means and a one-way rotatable means adapted to be rotated in only one direction when said two-way rotatable means is rotated in a given direction,
   each two-way rotatable means having a control arm for rotating said two-way rotatable means in a direction opposite said given direction,
   each of said control arms being offset a distance $d$ from the axis of its radial support,
   a sector shaped plate means supported for movement toward and away from said weight means,
   an electrical coil for moving said plate means toward the control arms of said weight means when actuated to contact and move said control arms of said weight means to rotate said two-way rotatable means in said opposite direction,
   return means for returning said two-way rotatable means to their initial positions when said plate means moves away from said control arms of said weight means, said plate means being defined by two side edges, inner and outer edges, a base plane and a top surface, said plate means having dimensions between its side edges such that it is capable of contacting and moving at least two control arms simultaneously, the top surface of said plate means having constant height contour surfaces extending from said inner edge to said outer edge and which are offset said distance d from radial lines extending from said axis of rotation of said rotatable means, said plate means having a maximum constant height contour surface with the height of said plate means on each side of said maximum contour surface decreasing in height toward said side edges, said plate means and said rotatable means being arranged to locate the control arms of each of said radial support means in line with said maximum height contour surface when the direction of travel coincides with the direction of each of said radial supports, the heights of said contour surfaces of said plate means above said base plane being defined by the following relationship:

$$M/\cos\phi(\alpha - \phi/\alpha)$$

M is the height of said maximum height contour surface above said base plane, and $\phi$ is the angle of travel relative to a given radial support when its weight's control arm is located above said plate means.

6. The device of claim 3 comprising:
a radially extending arm means supported by said shaft means and adapted to be located angularly at different desired positions relative to said rotatable means, and
weight means coupled to said arm means for radial movement along said arm means to a desired radial position to shift the center of gravity of said rotatable means in a desired manner.

7. A device for recording distance and direction of travel as it is moved along a course of traverse relative to a given point comprising:
support means adapted to be moved along a course of traverse,
rotatable means including a hub having a plurality of radially extending supports coupled thereto at different angular positions,
said rotatable means being coupled to said support means for rotation about an axis of rotation relative to said support means,
each radial support being assigned a different azimuth,
weight means supported for radial movement by each radial support,
azimuth finding means adapted to be aligned with a predetermined azimuth as said device is moved,
distance measuring means for producing an output which is a function of distance of travel over which said device is moved, and
means responsive to said distance measuring means and to said azimuth finding means for radially moving selected ones of said weight means an amount which is a function of the distance traveled in directions corresponding to the azimuths assigned to their radial supports,
said support means being adapted to be positioned to allow said axis of rotation to be located in a generally horizontal position to allow said rotatable means to rotate to a position of stable equilibrium depending upon the resultant weight shift applied to said rotatable means by the radial movement of said weight means.

8. A system for recording distance and direction of travel as it is moved along a course of traverse relative to a given point, comprising:
a wheel shaped rotatable member including a hub and an outer rim,
shaft means coupled to said member and to a movable support means for supporting said member for rotation about its axis relative to said support means,
a plurality of equally spaced spokes connected to said hub and extending radially outward to said rim, and a weight means supported by each spoke for radial movement between said hub and said rim for shifting the center of gravity of said rotatable member as a function of the distance and direction traveled with said system,
said support means being adapted to be positioned to allow said shaft means to be located in a generally horizontal position to allow said rotatable member to rotate to a position of stable equilibrium depending upon the resultant weight shift applied to said member by the radial movement of said weight means.

9. The system of claim 8 comprising:
a radially extending arm means coupled to said shaft means and adapted to be located angularly at different desired positions relative to said shaft means, and
weight means coupled to said arm means for movement to different radial positions to shift the center of gravity of said rotatable member in a desired manner.

10. The system of claim 9 comprising:
the combination therewith of means for locating magnetic north.

11. The system of claim 10 comprising:
means for radially moving said weight means on their spoke means to apply to said system information of distance and direction traveled.

12. The system of claim 11 wherein:
said spoke means are threaded rods,
each weight means comprising means coupled to its associated threaded rod for allowing each weight means to be threaded to different radial positions.

13. The system of claim 9 comprising:
means for radially moving said weight means on their spoke means to apply to said system information of distance and direction traveled.

14. The system of claim 8 comprising:
the combination therewith of means for locating magnetic north.

15. The system of claim 8 comprising:
means for radially moving said weight means on their spoke means to apply to said system information of distance and direction traveled.

16. The system of claim 14 comprising:

the combination therewith of means for locating magnetic north.

17. The device of claim 8 wherein:
said spoke means are threaded rods,
each weight means comprising means coupled to its associated threaded rod for allowing each weight means to be threaded to different radial positions.

18. A device for recording distance and direction of travel as it is moved along a course of traverse relative to a given point comprising:
support means adapted to be moved along a course of traverse,
rotatable means coupled to said support means for rotation about an axis of rotation relative to said support means,
said rotatable means including hub means, whose center coincides with said axis of rotation, and a plurality of radially extending supports connected to said hub means at different angular positions relative to the center of said hub means,
weight means supported for radial movement by each radial support,
each radial support being assigned a different azimuth,
means for aligning a given position of said rotatable means with a given azimuth as said support means is turned in different directions,
and
control means coupled to said support means at a fixed position relative to said axis of rotation for moving said weight means radially dependent upon the distance traveled with said device as said control means is moved near individual ones of said weight means as said support means is turned in different directions,
said support means being adapted to be positioned to allow said axis of rotation to be located in a generally horizontal position to allow said rotatable member to rotate to a position of stable equilibrium depending upon the resultant weight shift applied to said rotatable member by the radial movement of said weight means.

19. A system for recording distance and direction of travel as it is moved along a course of traverse relative to a given point comprising:
support means adapted to be moved along a course of traverse,
a rotatable member including a hub,
shaft means coupled to said hub and to said support means for supporting said rotatable member for rotation relative to said support means about an axis defined by said shaft means,
a plurality of radially extending supports coupled to said hub at different angular positions relative to said shaft for rotation with said hub, and
a weight means coupled to each radial support for movement to positions between said axis of rotation and a given perimeter outward from said axis of rotation to shift the center of gravity of said rotatable member as a function of the distance and direction traveled with said system,
said support means being adapted to be positioned to allow said shaft means to be located in a generally horizontal position to allow said rotatable member to rotate to a position of stable equilibrium dependent upon the resultant weight shift applied to said rotatable member by the movement of said weight means between said axis of rotation and said given perimeter.

20. A method of recording distance and direction of travel with a recording means as it is moved along a course of traverse and for obtaining information along the course of traverse as to the direction of a given point of interest along the path of traverse, said recording means comprising:
support means adapted to be moved along a course of traverse,
a rotatable member including a hub,
shaft means coupled to said hub and to said rotatable member for supporting said rotatable member for rotation relative to said support means about an axis defined by said shaft means,
a plurality of radially extending supports coupled to said hub at different angular positions relative to said shaft for rotation with said hub,
each radial support being assigned a different azimuth, and
a weight means coupled to each radial support for movement to positions between said axis of rotation and a given perimeter outward from said axis of rotation to shift the center of gravity of said rotatable member as a function of the distance and direction traveled with said recording means,
said support means being adapted to be positioned to allow said shaft means to be located in a generally horizontal position to allow said rotatable member to rotate to a position of stable equilibrium dependent upon the resultant weight shift applied to said rotatable member by the movement of said weight means between said axis of rotation and said given perimeter,
said method comprising the steps of:
when traveling in a given direction which corresponds to the azimuth assigned a given radial support, moving the weight means of said given radial support, between said axis of rotation and said given perimeter, an amount which is a function of the distance traveled in said given direction,
when it is desired to obtain information as to the direction of a given point of interest along the path traversed, positioning said support means in a manner to allow said shaft means to be located in a generally horizontal position to allow said rotatable member to rotate to a position of stable equilibrium depending upon the resultant weight shift applied to said rotatable member by the radial movement of said weight means between said axis of rotation and said given perimeter, and
employing the position of stable equilibrium of said rotatable member to obtain the sought after information of direction.

21. A system for recording distance and direction of travel as it is moved along a course of traverse relative to a given point comprising:
support means adapted to be moved along a course of traverse,
rotatable means coupled to said support means for rotation about an axis of rotation relative to said support means,
a plurality of radially extending supports coupled to said rotatable means at different angular positions about said axis for rotation with said rotatable means, a weight means coupled to each radial support for movement to positions between said axis of rotation and a given perimeter outward from said axis of rotation for shifting the center of gravity of said rotatable means as a function of the distance and direction traveled with said system, said support means being adapted to be positioned to allow said axis of rotation to be located in a generally horizontal position to allow said rotatable means to rotate to a position of stable equilibrium dependent upon the resultant weight shift applied to said rotatable means by the movement of said weight means between sid axis of rotation and said given perimeter.

* * * * *